(12) United States Patent
Hayashida

(10) Patent No.: US 7,599,541 B2
(45) Date of Patent: Oct. 6, 2009

(54) RADIOGRAPHIC APPARATUS AND RADIOGRAPHIC METHOD

(75) Inventor: Shinsuke Hayashida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 610 days.

(21) Appl. No.: 10/926,384

(22) Filed: Aug. 25, 2004

(65) Prior Publication Data

US 2005/0047639 A1    Mar. 3, 2005

(30) Foreign Application Priority Data

Aug. 26, 2003  (JP)  ............................. 2003-302003
Jun. 15, 2004  (JP)  ............................. 2004-177340

(51) Int. Cl.
*G06K 9/00*    (2006.01)
(52) U.S. Cl. ...................... 382/132; 382/312; 378/91
(58) Field of Classification Search ................. 382/132, 382/312; 378/91
See application file for complete search history.

(56) References Cited

U.S. PATENT DOCUMENTS

| 4,810,881 | A | 3/1989 | Berger et al. |
| 5,132,539 | A | 7/1992 | Kwasnick et al. |
| 5,381,014 | A | 1/1995 | Jeromin et al. |
| 5,396,072 | A | 3/1995 | Schiebel et al. |
| 5,418,377 | A | 5/1995 | Tran et al. |
| 5,923,722 | A * | 7/1999 | Schulz ........................ 378/98.8 |
| 6,404,853 | B1 * | 6/2002 | Odogba et al. .............. 378/98.8 |
| 6,497,511 | B1 * | 12/2002 | Schmitt et al. ............... 378/207 |
| 6,529,618 | B1 * | 3/2003 | Ohara et al. ................. 382/132 |
| 6,928,142 | B2 * | 8/2005 | Shao et al. ..................... 378/63 |
| 7,065,177 | B2 * | 6/2006 | Yanoff et al. .............. 378/98.12 |
| 2001/0033678 | A1 * | 10/2001 | Hirai ........................... 382/128 |
| 2003/0072417 | A1 * | 4/2003 | Kaufhold et al. ............ 378/207 |
| 2003/0072418 | A1 * | 4/2003 | Albagli et al. ............... 378/207 |

FOREIGN PATENT DOCUMENTS

| DE | 197 51 298 A1 | 6/1998 |
| JP | 2001-307064 | 11/2001 |
| JP | 2001-351091 | 12/2001 |

OTHER PUBLICATIONS

English Abstract for Japanese Patent Application Laid Open No. 2001-351091.
English Abstract for Japanese Patent Application Laid Open No. 2001-307064.

* cited by examiner

*Primary Examiner*—Brian P Werner
*Assistant Examiner*—Katrina Fujita
(74) *Attorney, Agent, or Firm*—Cowan, Liebowitz & Latman, P.C.

(57) ABSTRACT

A radiographic method and apparatus determine the presence/absence of an afterimage and notify a user to erase the afterimage only when it is necessary instead of erasing the afterimage every time radiography is executed. An FPN image is obtained before radiography and uniformity of the values of pixels contained in the FPN image is determined by using the values of the pixels contained in the FPN image.

2 Claims, 15 Drawing Sheets

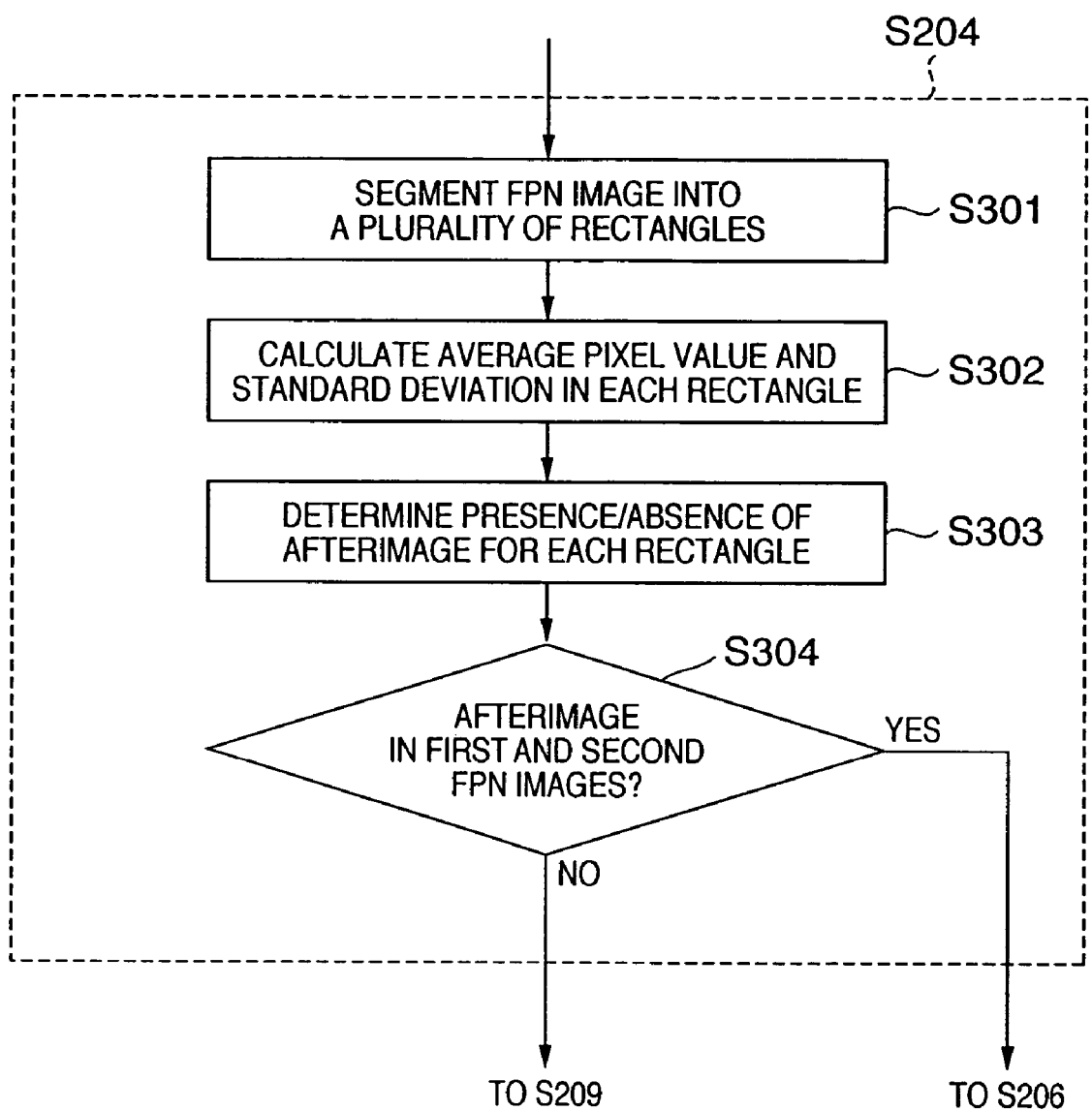

FIG. 4

| | | SECOND FPN IMAGE (IN ACQUIRING WHITE IMAGE) | |
|---|---|---|---|
| | | AFTERIMAGE IS PRESENT | NO AFTERIMAGE IS PRESENT |
| SECOND FPN IMAGE (BEFORE RADIOGRAPHY) | AFTERIMAGE IS PRESENT | AFTERIMAGE ERASE : WHITE IMAGE<br>+<br>AFTERIMAGE ERASE : BEFORE RADIOGRAPHY<br>OR *NOTES | AFTERIMAGE ERASE : BEFORE RADIOGRAPHY<br><br>AFTERIMAGE ERASE BY "UNIFORM HIGH DOSE IRRADIATION RADIOGRAPHY" OR "Sleep TIME" |
| | NO AFTERIMAGE IS PRESENT | AFTERIMAGE ERASE : WHITE IMAGE<br><br>AFTERIMAGE ERASE BY "WHITE IMAGE RE-RADIOGRAPHY" AND "PROLONGING Sleep TIME" | AFTERIMAGE ERASE IS UNNECESSARY |

*NOTES : WHEN POSITION AND AMOUNT OF AFTERIMAGE IN FIRST FPN IMAGE ARE SAME AS THOSE IN SECOND FPN IMAGE, AFTERIMAGE ERASE IS UNNECESSARY

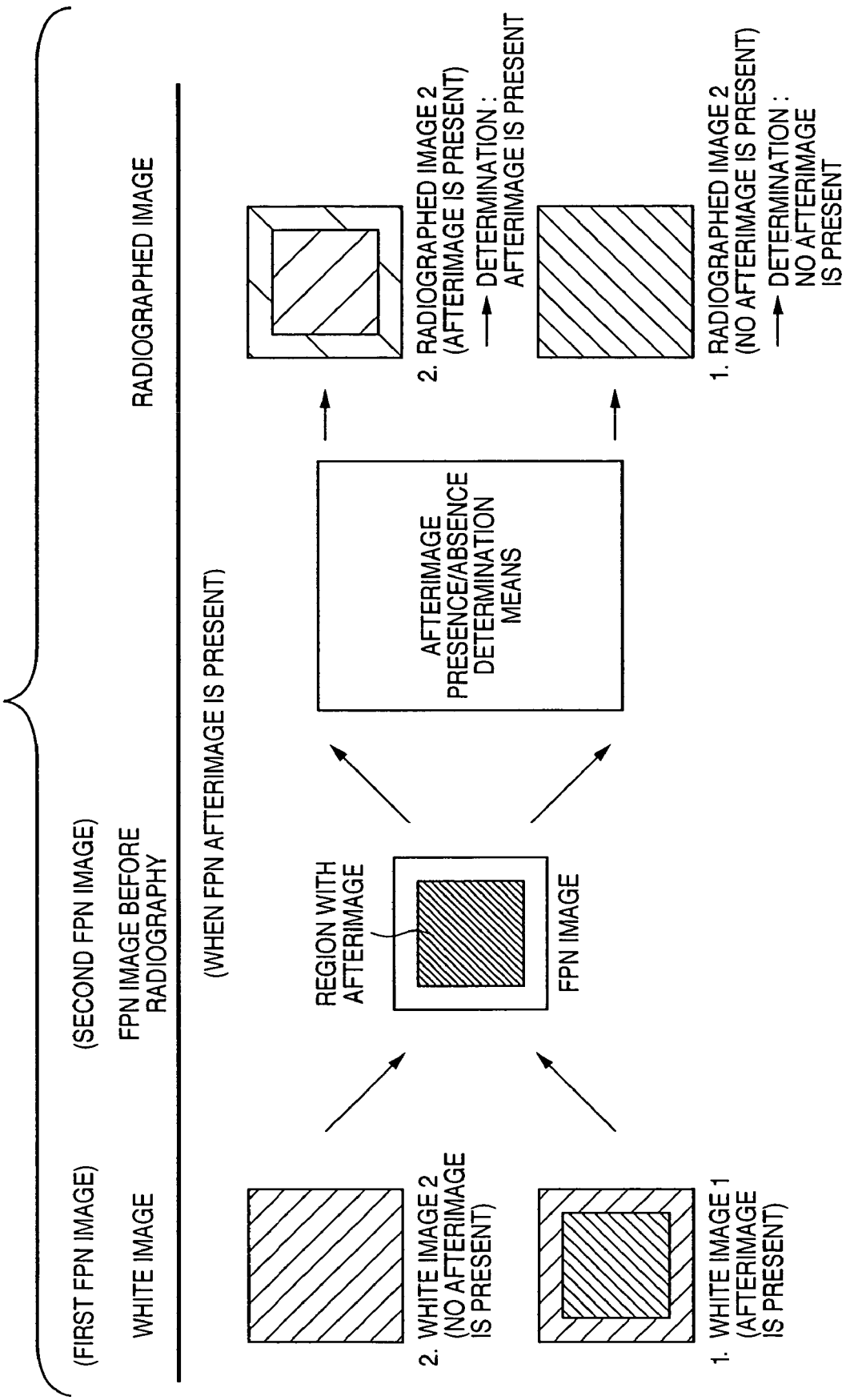

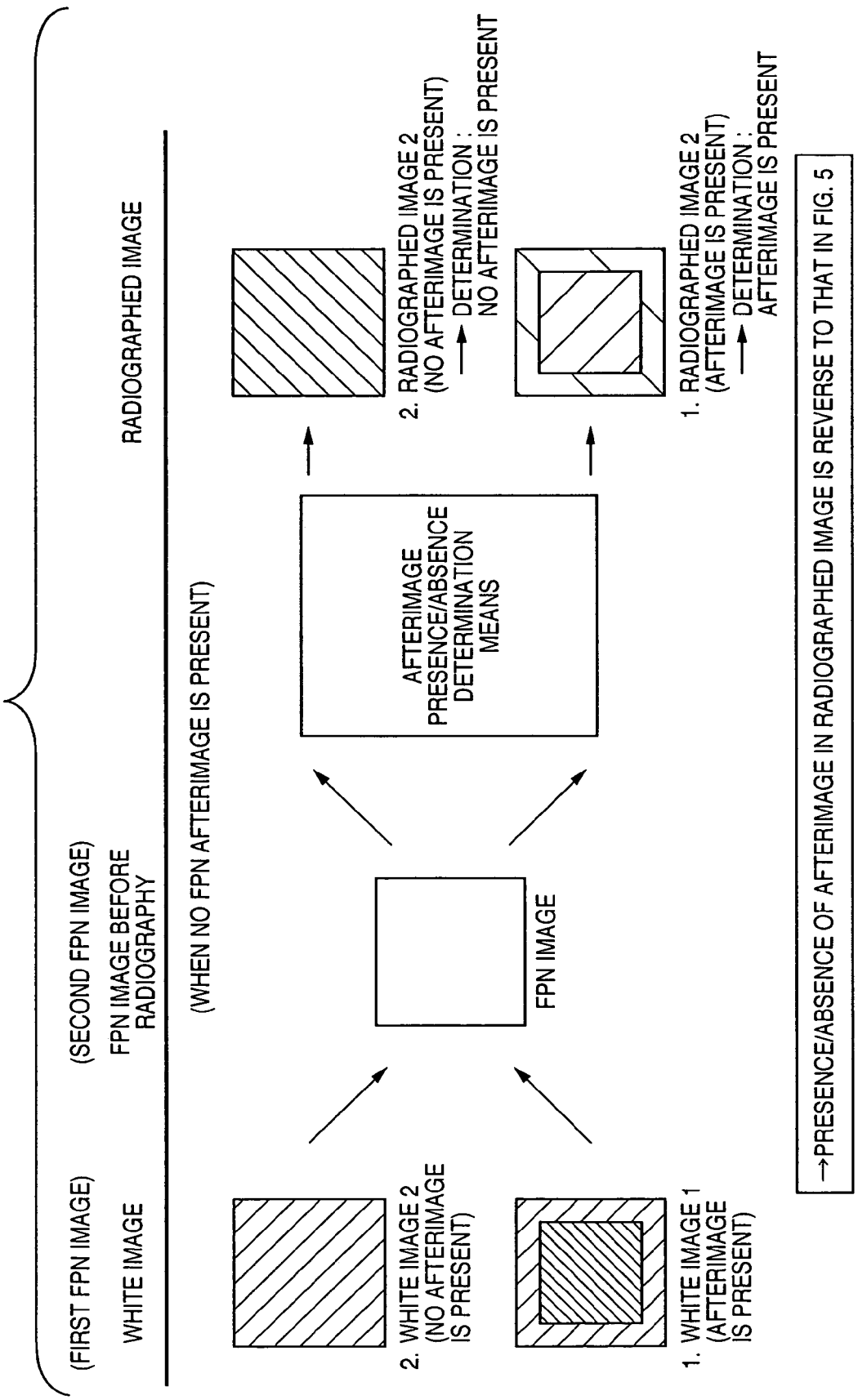

RADIOGRAPHIC APPARATUS AND RADIOGRAPHIC METHOD

CLAIM OF PRIORITY

This application claims the benefit of Japanese Patent Application No. 2003-302003 filed on Aug. 26, 2003 and Japanese Patent Application No. 2004-177340 filed on Jun. 15, 2004, which are hereby incorporated by reference herein in their entirety.

FIELD OF THE INVENTION

The present invention relates to a radiographic method and apparatus for executing radiography.

BACKGROUND OF THE INVENTION

Conventionally, methods (radiographic image acquisition methods) of obtaining a radiographic image of a target are widely used for industrial nondestructive inspection or medical diagnosis. In a radiographic image acquisition method, generally, a target is irradiated with radiation, and the intensity distribution of the radiation that has passed through the target is detected.

More specifically, the most general method of the radiographic image acquisition methods is as follows.

A so-called "phosphor screen" (or "intensifying screen") which emits florescent light in accordance with irradiation of radiation is combined with a silver halide film. This combined structure is irradiated with radiation through a target. The phosphor screen converts the radiation into visible light so that a latent image of the target is formed on the silver halide film. The silver halide film on which the latent image of the target is formed is chemically processed. Accordingly, a visible image of the target (a radiographic image of the target) can be obtained on the silver halide film.

A radiographic image obtained by such a radiographic image acquisition method is a so-called analog photo and is used for radiodiagnosis or tests.

Use of computed radiographic apparatuses (to be referred to as "CR apparatuses" hereinafter) which use an imaging plate (to be referred to as an "IP" hereinafter) coated with a photostimulable phosphor is also starting.

The above-described CR apparatuses are digital radiographic apparatuses. However, since an image formation process for a read by secondary excitation is necessary, they cannot immediately display a radiographed image (radiographic image), like an analog photo.

In recent years, apparatuses have been developed, which acquire digital radiographic images by using, as an image reception means, a photoelectric conversion means (an imaging element such as a CCD) on which pixels including small photoelectric conversion elements and switching elements are arrayed in a matrix.

Such apparatuses have conventionally been disclosed as radiographic apparatuses in which a phosphor is stacked on a CCD or an amorphous silicon two-dimensional imaging element (e.g., U.S. Pat. Nos. 5,418,377, 5,396,072, 5,381,014, 5,132,539, and 4,810,881).

In a radiographic apparatus using a two-dimensional imaging element, normally, correction called FPN correction or white correction is executed before image formation. FPN correction (Fixed Pattern Noise correction) corrects noise generated due to a dark current in each element of the two-dimensional imaging element.

To execute FPN correction, normally, an FPN image without X-ray irradiation is acquired under the same driving conditions as in X-ray irradiation. The FPN image is subtracted from an X-ray image, thereby executing correction. White correction is also called gain correction and corrects the sensitivity difference between the elements of a two-dimensional imaging element (gain correction in this specification means white correction). To execute white correction, normally, subtraction processing for a radiographed image is executed by using an image (a white image) acquired by X-ray irradiation within a dose range with linearity. The corrected radiographic image is effective in, e.g., a medical scene with urgency because it can immediately be displayed within about 3 sec even when another image processing called QA processing is executed. Advantages of these digital radiographic apparatuses over the analog photo technology are filmless processing, an increase in acquired information amount by image processing, and database building.

Even in the above-described digital radiographic apparatuses using an imaging element of amorphous silicon or the like as an image reception means, an afterimage may remain in the image in accordance with an irradiation variation in pre-exposure, as in the radiographic apparatuses using a film or CR. FIG. 8 shows the concept of the time characteristic of an afterimage by a phosphor. An afterimage is generated by a phosphor afterglow. The ordinate is normalized on the basis of the X-ray dose of pre-exposure. As shown in FIG. 8, the phosphor afterglow attenuates over time. Then, the afterimage amount is almost constant. When the afterimage amount changes over time, as shown in FIG. 8, an afterimage remains on an image by a digital radiographic apparatus. This is because an imaging apparatus using a two-dimensional imaging element executes FPN correction.

The afterimage amount difference between the X-ray image acquisition mode and the FPN image acquisition mode remains as an afterimage in the FPN-corrected image. Except the phosphor afterglow, for example, the transfer residue in the imaging element can also generate an afterimage. The afterimages include not only the FPN afterimage (additive lag) but also a sensitivity afterimage (multiplicative lag). A sensitivity afterimage appears on an image when the light emission amount of the phosphor changes at the time of X-ray irradiation in accordance with its prior state, unlike FIG. 8. The sensitivity afterimage cannot be grasped without X-ray irradiation. Hence, the afterimage to be grasped is limited to the FPN afterimage.

To erase the afterimages, a method called optical reset in which the imaging element of amorphous silicon or the like is fully irradiated with visible light of an LED, a method of executing white radiography (calibration) before radiography, or a method of prolonging the sleep time of the sensor has conventionally been used.

However, always executing the prior-art afterimage erase methods requires time and labor. Especially, when no afterimage is present, these methods are executed only wastefully from the viewpoint of radiographic throughput. To omit the process, a means for grasping the presence/absence of an afterimage in advance is necessary. In the conventional analog apparatuses using a film or CR apparatuses, it is difficult to determine the presence/absence of an afterimage because of the film development time or IP read time of CR. In the radiographic apparatus using a two-dimensional imaging element, however, an image can instantaneously be acquired. Hence, it is technically possible to determine the presence/absence of an afterimage before radiographing an object.

SUMMARY OF THE INVENTION

The present invention has been made in consideration of the above-described problem, and has as its object to provide a technique for determining the presence/absence of an afterimage and notifying a user of it to execute afterimage erase only when it is necessary instead of executing afterimage erase every time radiography is executed.

In order to achieve the above object, for example, a radiographic apparatus of the present invention comprises the following arrangement.

That is, a radiographic apparatus for executing radiography, comprising: acquisition means for acquiring an FPN image before radiography; and determination means for determining presence/absence of an afterimage by using the FPN image.

In order to achieve the above object, for example, a radiographic apparatus of the present invention comprises the following arrangement.

That is, a radiographic apparatus for executing radiography, comprising: setting means for setting one of a reference image radiography mode and a radiographic image radiography mode; first acquisition means for acquiring a first FPN image as a reference when the reference image radiography mode is set by the setting means; second acquisition means for acquiring a second FPN image before radiography when the radiographic image radiography mode is set by the setting means; and determination means for determining presence/absence of an afterimage by using the first FPN image and the second FPN image.

In order to achieve the above object, for example, a radiographic method of the present invention comprises the following arrangement.

That is, a radiographic method of executing radiography, comprising: an acquisition step of acquiring an FPN image before radiography; and a determination step of determining presence/absence of an afterimage by using the FPN image.

In order to achieve the above object, for example, a radiographic method of the present invention comprises the following arrangement.

That is, a radiographic method of executing radiography, comprising: a setting step of setting one of a reference image radiography mode and a radiographic image radiography mode; a first acquisition step of acquiring a first FPN image as a reference when the reference image radiography mode is set in the setting step; a second acquisition step of acquiring a second FPN image before radiography when the radiographic image radiography mode is set in the setting step; and a determination step of determining presence/absence of an afterimage by using the first FPN image and the second FPN image.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3 is a flowchart showing processing in step S204, i.e., processing for determining the presence/absence of an afterimage in the first FPN image and the presence/absence of an afterimage in the second FPN image (determining the presence/absence of an afterimage in the first and second FPN images);

FIG. 4 is a view showing classification of afterimage erase methods;

FIG. 5 is a view for complementarily explaining the processing for determining the presence/absence of an afterimage;

FIG. 6 is a view for complementarily explaining the processing for determining the presence/absence of an afterimage;

DETAILED DESCRIPTION OF THE PREFERRED EMBODIMENTS

Preferred embodiments of the present invention will now be described in detail in accordance with the accompanying drawings.

First Embodiment

<Overall Arrangement of Radiographic Apparatus 100>

Figure 1:
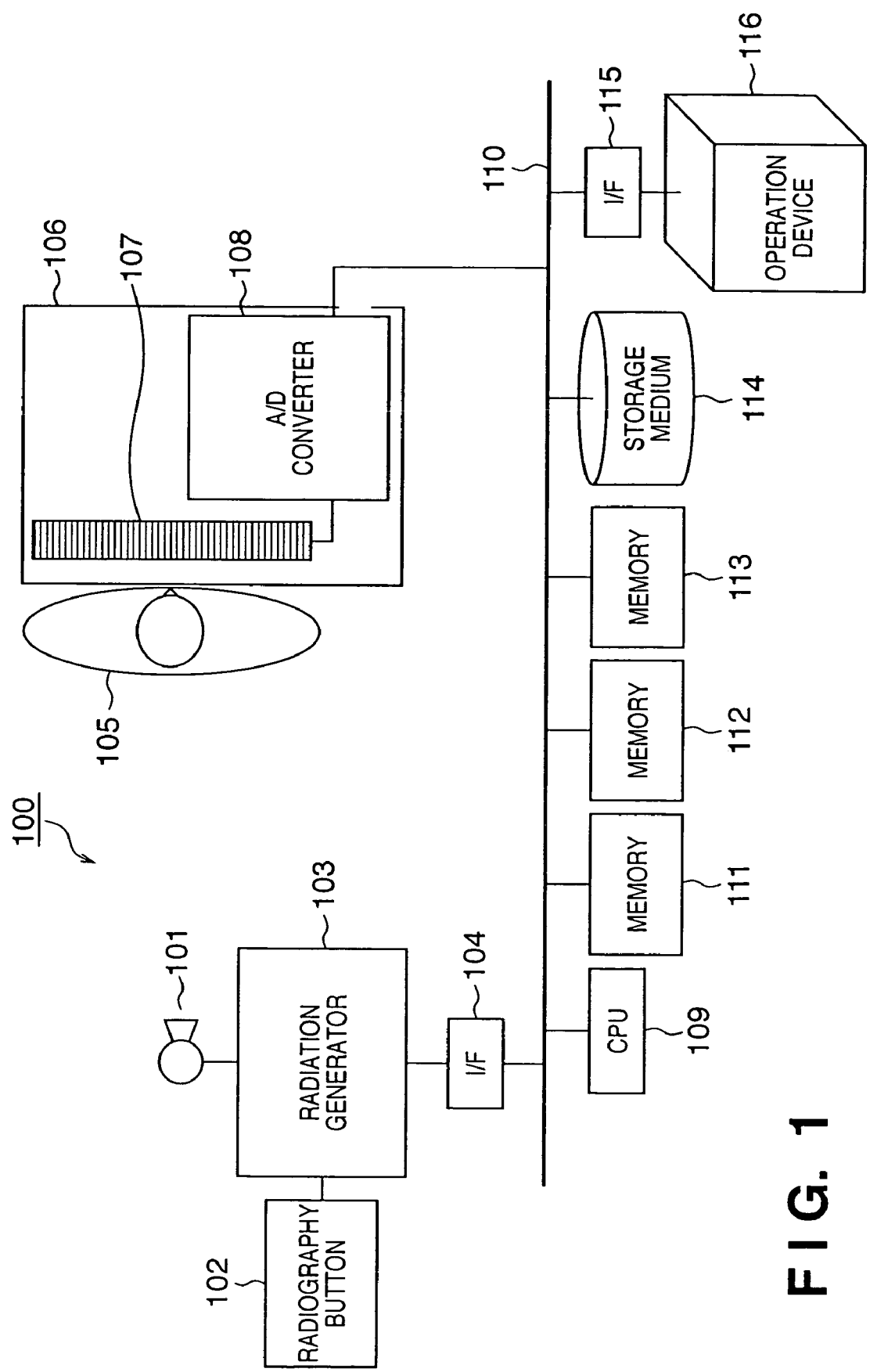
FIG. 1 is a block diagram showing the basic arrangement of a radiographic apparatus 100 according to an embodiment of the present invention.

FIG. 1 is a block diagram showing the basic arrangement of a radiographic apparatus 100 according to this embodiment.

A radiation tube 101 emits radiation (e.g., X-rays) to an object 105. The radiation is generated by a radiation generator 103. A generation instruction can be input by using an operation button 102. When a radiation generation instruction is input by using the operation button 102, a signal indicating the instruction is input to a CPU 109 through an I/F 104. The CPU 109 interprets the signal and outputs a signal to control the radiation generator 103 and cause it to generate radiation to the radiation generator 103 through the I/F 104.

In the above-described way, the object 105 is irradiated with radiation from the radiation tube 101. The radiation which irradiates the object 105 passes through it while decreasing the radiation dose and reaches a radiographic unit 106.

The radiographic unit 106 includes a radiation detection unit 107 and an A/D converter 108. The radiation detection unit 107 includes an imaging element formed by placing a phosphor on the front surface of a photodetector including, e.g., amorphous silicon and TFTs, a driving control unit of the imaging element, and an amplifier IC. The radiation detection unit 107 amplifies and outputs a signal based on the dose of radiation that has passed through the object and reached the radiographic unit. The output signal (analog signal) is converted into a digital signal by the A/D converter 108 and output to a storage medium 114 or the display surface (to be described later) of an operation device 116.

The digital signal represents an image obtained by radiographing the object. This image will be referred to as a radiographic image hereinafter.

The CPU 109 executes various kinds of processing by using programs and data stored in memories 111 to 113. The CPU 109 accordingly controls the units of the radiographic apparatus to control various kinds of radiographic processing (to be described later) or execute FPN image uniformity determination processing (to be described later).

The memory 111 stores programs and data to be used by the CPU 109 to control the units of the radiographic apparatus to control various kinds of radiographic processing (to be described later) or execute FPN image uniformity determination processing (to be described later).

The memory 112 stores the data of the radiographic image output from the A/D converter 108 and also stores the data of an FPN image (to be described later) that is obtained before radiography.

The memory 113 stores a white image (to be described later) and FPN image in radiographing a white image.

In this embodiment, three memories are used. However, the number of memories is not limited to this. For example, three storage areas may be formed on one memory to respectively store the contents stored in the memories 111 to 113.

The storage medium 114 is an information memory device such as a hard disk drive device. In this embodiment, the storage medium 114 is used to store image data after correction processing (to be described later).

The operation device 116 functions as an input interface device to input various kinds of settings of the radiographic apparatus 100. The input setting data is input to the CPU 109 through an I/F 115 and interpreted by the CPU 109. The CPU 109 executes processing corresponding to the interpreted contents. The operation device 116 includes, e.g., a touch panel on which the images of buttons and sliders to input various kinds of information are displayed. Various kinds of settings can be done by pointing these images with a finger or a pointing tool. A window (to be described later) shown in FIG. 7 can also be displayed on the display screen of the touch panel.

By using the operation device 116, the operator of the radiographic apparatus 100 can cause the display function to display image data stored in the storage medium 114 and execute various operations.

A bus 110 connects some of the above-described units.

The radiographic apparatus 100 may have an arrangement other than that shown in FIG. 1. The arrangement of the radiographic apparatus 100 according to this embodiment is not limited to that shown in FIG. 1.

For example, a large display apparatus may be connected to the radiographic apparatus 100 to display information for more operators. An A/D converter and loudspeaker may be connected to the radiographic apparatus 100 to notify the operator of various kinds of information by sound.

<Series of Operations of Radiographic Apparatus 100>

A series of radiographic processes executed by the radiographic apparatus 100 according to this embodiment will schematically be described next.

Assume that radiography to obtain a white image has already been executed before processing to be described below, and the data of a white image and data of an FPN image in white image radiography are obtained. Hence, the memory 113 stores the white image data and the FPN image data. The reference FPN image will be referred to as a "first FPN image" hereinafter to avoid any confusion with an FPN image to be described later. In this embodiment, the reference FPN image will be explained as an FPN image obtained in white image radiography. The "first FPN image" used in this embodiment is not limited to the FPN image acquired at that time. The "first FPN image" may be, e.g., an average image of a plurality of FPN images in the past, which are obtained by using the same radiographic apparatus 100, or an FPN image acquired in acceptance inspection or shipment from the factory.

First, the operator (e.g., radiographer) inputs, to the radiographic apparatus 100, patient information, i.e., information to specify the patient, including the name, height, weight, date of birth, and sex of the patient (object), and radiography condition information including the target (test target) to be irradiated with radiation, tube voltage (kVp), tube current (mA), and radiation irradiation time (msec) by using the operation device 116.

Next, the operator inputs an instruction by using the radiography button 102 to radiograph a second FPN image different from the first FPN image. The instruction is input to the CPU 109 and interpreted to control the units. The second FPN image is radiographed in accordance with the above-described radiography procedures. The data is output from the radiographic unit 106 and stored in the memory 112. Radiography of the second FPN image may be instructed by inputting patient information or radiography condition information through the operation device 116, instead of using the radiography button 102.

An FPN image (second FPN image) is acquired before radiography to confirm whether the FPN image has no non-uniformity such as an afterimage. Hence, the driving conditions in FPN image acquisition before radiography are preferably the same as those in acquiring the reference FPN image.

The uniformity between the first FPN image and the second FPN image is determined by processing to be described later. The conventional afterimage erase processing is executed depending on the determination result.

When the above processing is ended, the object 105 is aligned on the radiographic unit 106 such that the test target is located at the radiation irradiation position. When the operator presses the radiography button 102, the CPU 109 detects it. Radiation is generated, and a radiographic image of the test target is obtained. Note that the CPU 109 initializes the radiation detection unit 107 upon detecting that the operator presses the radiography button 102. After that, the CPU 109 controls the radiation generator 103 to cause it to generate radiation and causes the radiation tube 101 to emit the radiation.

The radiation emitted from the radiation tube 101 is detected by the radiation detection unit 107 (the light-receiving surface of the imaging element) as a transmitted radiation distribution corresponding to the internal structure of the object 105 (test target).

The radiation detection unit 107 executes two-dimensional photoelectric conversion in accordance with the two-dimensional light intensity distribution of the received radiation to acquire an analog radiographic image signal (analog image signal) of the object 105. The acquired analog image signal is output to the A/D converter 108.

The A/D converter 108 converts the analog image signal from the radiation detection unit 107 into a digital signal. The converted digital signal is output to the memory 112 through the I/F 115 as radiographic image data. The radiographic image data may also be output to the operation device 116. In this case, the radiographic image is displayed on the display screen of the operation device 116.

After the image data is transmitted to the A/D converter 108, the radiation detection unit 107 acquires an FPN image without radiation irradiation. The FPN image is stored in the memory 112 through the A/D converter 108, like the radiographic image.

As described above, the white image data is stored in the memory 113 before the start of the processing. The CPU 109 executes FPN correction processing and gain correction processing (gain correction arithmetic processing) for the radiographic image data stored in the memory 112 by using the white image data. The CPU 109 stores the radiographic image data which has undergone the gain correction processing in the storage medium 114. The radiographic processing is thus ended.

After that, by operating the operation device 116, the operator can input an instruction to read out the radiographic image data (image data after gain correction processing) from the storage medium 114 and input the image data to an imager that draws a digital image on a film or a radiodiagnostic monitor in accordance with the use purpose.

<Driving of the Radiographic Apparatus 100>

Figure 11:
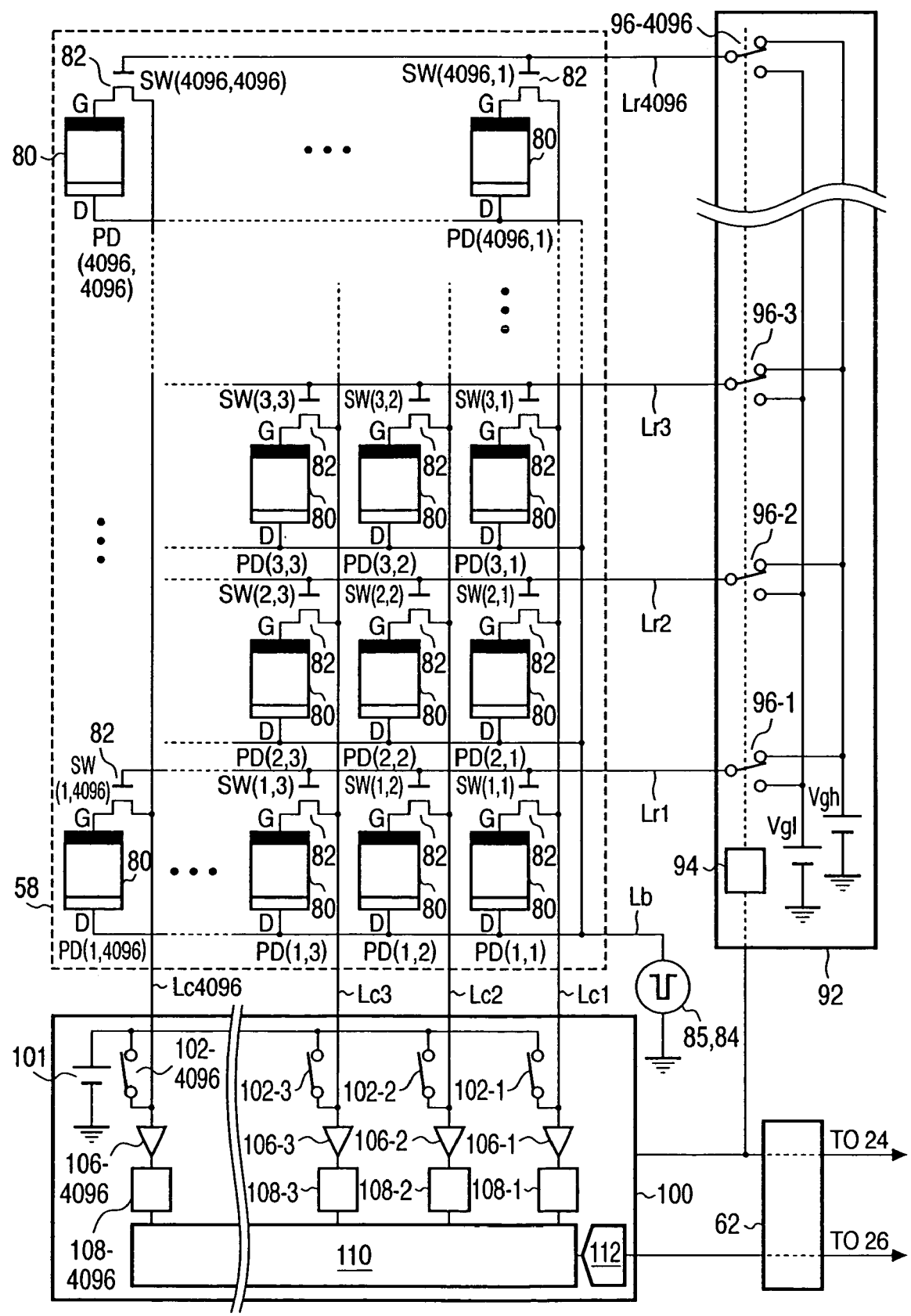
FIG. 11 is a view showing an example of the structure of a photodetector array.
Figure 12:
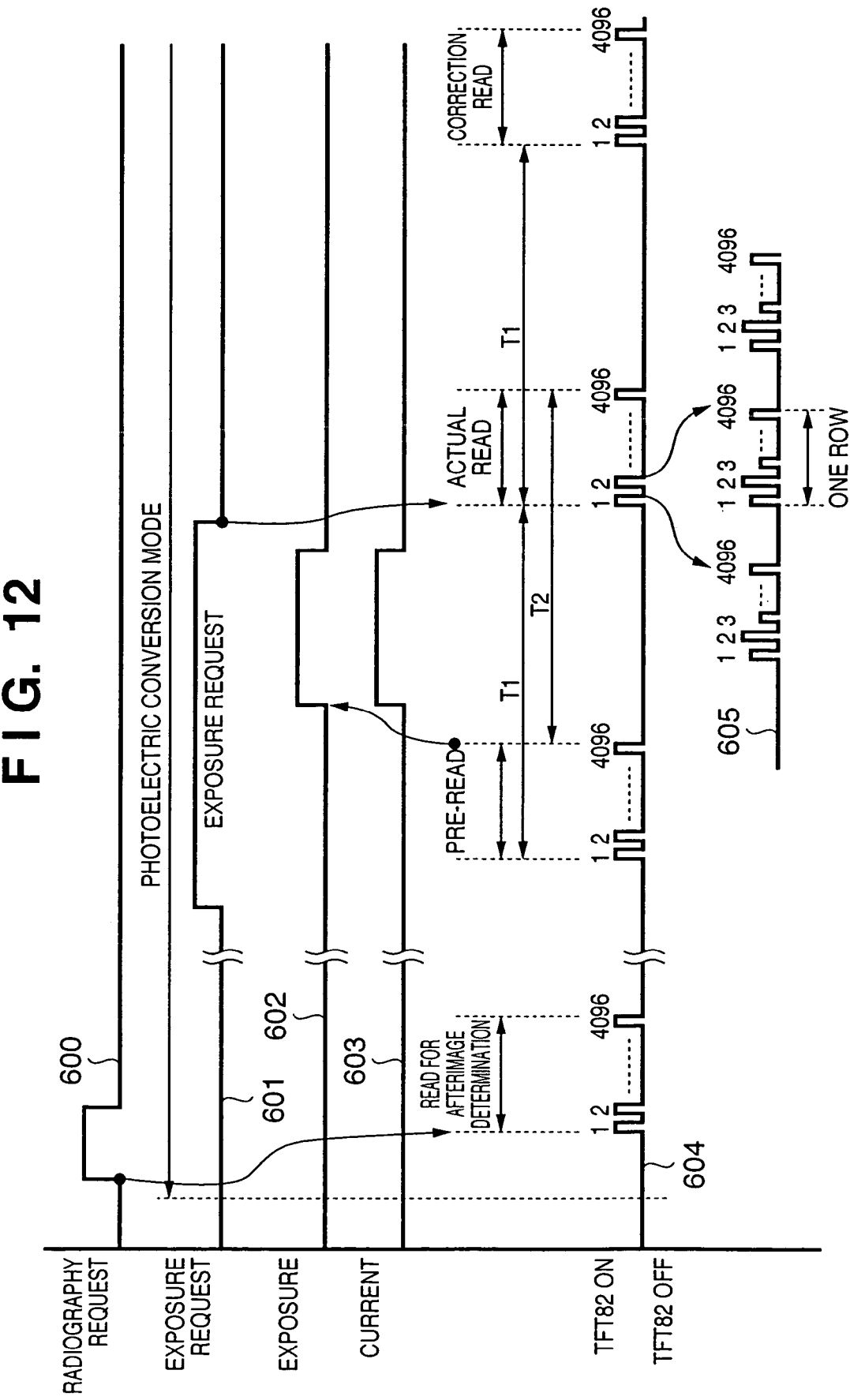
FIG. 12 is a timing chart showing the concept of driving of the photodetector array.

FIG. 12 is a schematic timing chart of a sensor read according to this embodiment. FIG. 11 is an equivalent circuit diagram of a photodetector array 58 having two-dimensionally arrayed photoelectric conversion elements. Two-dimensional driving in X-ray imaging, including driving in FPN image acquisition for afterimage determination, will be described with reference to FIGS. 11 and 12.

Reference numeral 600 denotes a radiography start signal input by the operator; 601, an X-ray exposure request control signal; 602, an X-ray exposure state; 603, a current of the current source in the sensor; 604, a control state of a row selection line Lrn; and 605, an analog input to the A/D converter 108.

The schematic timing chart of the sensor read which is shown in FIG. 12, is roughly divided into three stages. The first stage is an afterimage determination read+pre-read operation. The second stage is a read operation at the time of X-ray exposure. The third stage is a pre-read operation for correction after the X-ray image read. The pre-read operation and the read operation in X-ray image exposure are different only in the presence/absence of signal charge reception, and the difference in driving is not so large.

A detailed embodiment of the driving will be described below.

First stage: afterimage determination read+pre-read operation

The afterimage determination read and pre-read operation are basically the same driving. That is, the largest difference is whether signal charges are read. An embodiment of this driving will be described below.

A bias wiring line is kept at a bias value Vs in photoelectric conversion. In this state, all column signal wiring lines Lc are connected to a reset reference potential 101 to reset them. After that, a positive voltage Vgh is applied to a row selection wiring line Lr1 to turn on SWs (1,1) to (1,4096) and reset the G electrodes of the photoelectric conversion elements of the first column to Vbt. Next, the row selection wiring line Lr1 is set to a positive voltage Vg1 to turn off the SWs (1,1) to (1,4096). Selection of a row is sequentially repeated to reset all pixels. Preparation for radiography is thus ended. The above-described operation is the same as the signal charge read operation except that no signal charges are received. This reset operation will be referred to as a "pre-read" hereinafter. The reason why all row selection wiring lines Lr are not set to Vgh simultaneously during the pre-read operation is as follows. In this case, the signal wiring line potential largely deviates from the reset voltage Vbt when the preparation for the read is ended. Hence, it is difficult to obtain a signal having a high S/N ratio. In the above-described example, the row selection wiring lines Lr are reset from 1 to 4,096. However, they can be reset in an arbitrary order by controlling a driver 62 on the basis of the setting of a radiography controller 24.

When a radiography start request is input, the afterimage determination read starts. Subsequently, the pre-read operation is repeated, and an X-ray exposure request is waited.

If it is determined by the afterimage determination that no afterimage is present, X-ray exposure is requested.

Second stage: read operation at the time of X-ray exposure

The read operation at the time of X-ray exposure includes two operations: a pre-read operation immediately before exposure and a read operation at the time of X-ray exposure.

In the pre-read operation immediately before exposure, after an exposure request is generated, the pre-read operation is executed again for preparation for image acquisition, thereby preparing for X-ray exposure. After the pre-read operation immediately before is executed, and preparation for image acquisition is done, X-ray exposure is executed in accordance with an instruction from the radiography controller 24.

X-ray exposure is executed, and the read of signal charges of a photoelectric conversion element 80 starts. The basic read operation is the same as the pre-read operation except that a signal is actually read.

First, the voltage Vgh is applied to the row selection wiring line Lr corresponding to a given row (e.g., Lr1) of the photoelectric conversion element array, and cumulative charge signals are output to signal wiring lines Lc1 to Lc4096. The signals of 4,096 pixels are read simultaneously from each of the column signal wiring lines Lc1 to Lc4096.

Next, the voltage Vgh is applied to a different row selection wiring line Lr (e.g., Lr2), and cumulative charge signals are output to signal wiring lines Lc1 to Lc4096. The signals of 4,096 pixels are read simultaneously from each of the column signal wiring lines Lc1 to Lc4096. This operation is sequentially repeated for the 4,096 column signal wiring lines, thereby reading all pieces of image information.

The charge accumulation time of each sensor during the above operation is from the end of the reset operation, i.e., from turning off a TFT 82 in the pre-read operation until turning on the TFT 82 for the next charge read. Hence, the accumulation time and timing change between the row selection lines.

Third stage: pre-read operation for correction after X-ray image read

After the X-ray image is read, a correction image is acquired. The correction image is correction data necessary for acquiring a high-quality image and is used to correct the X-ray image. The basic image acquisition method is the same as in acquiring the X-ray image except that no X-ray exposure is executed. The charge accumulation time in reading the correction image is the same as that in reading the X-ray image.

Figure 13:
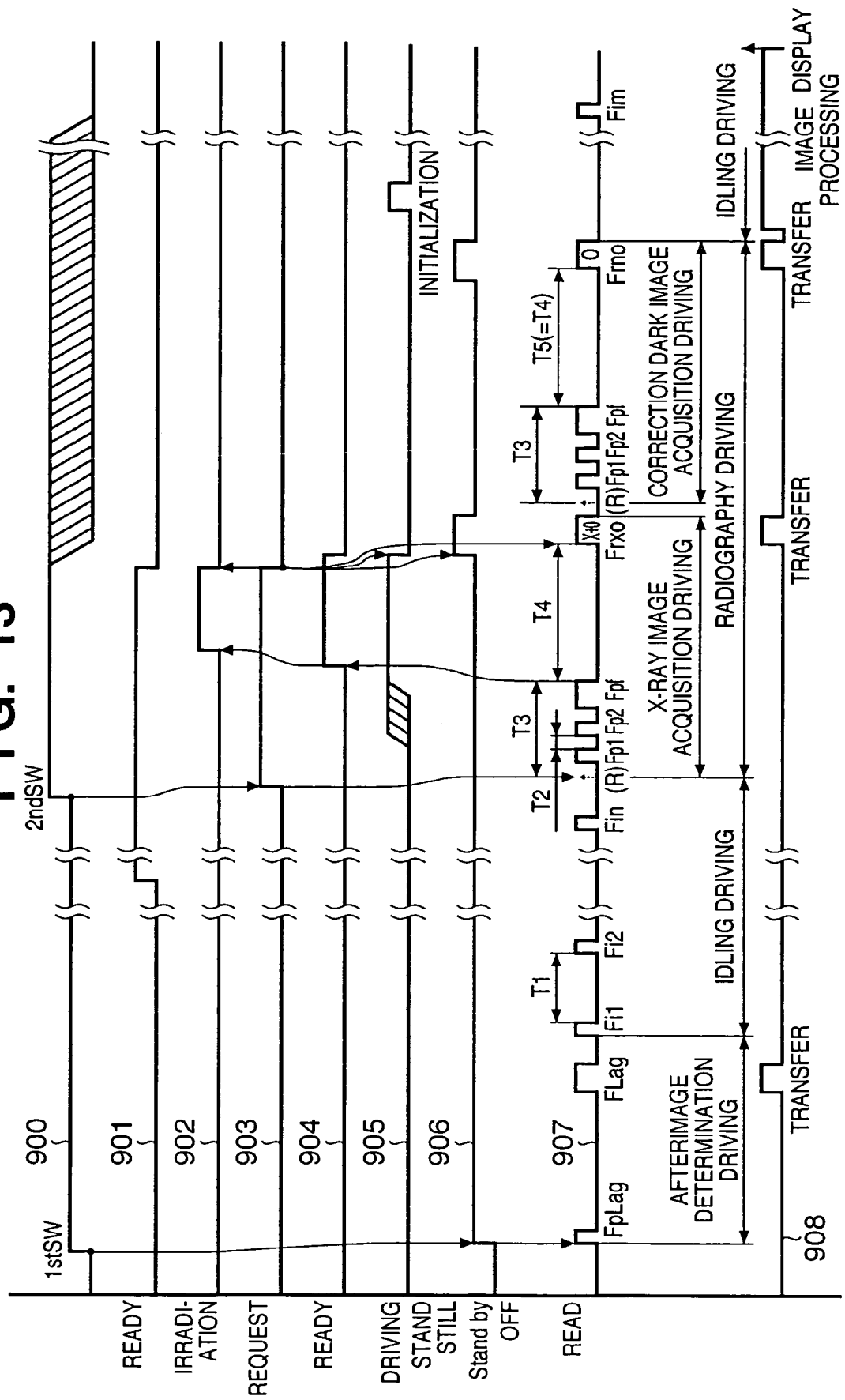
FIG. 13 is a timing chart of the X-ray imaging system.

FIG. 13 is a timing chart of the radiographic apparatus 100. Reference numeral 901 denotes a radiography request signal to the X-ray generator; 902, an actual X-ray exposure state; 903, a radiography request signal from the radiography controller 109 to the driver 62 based on an instruction from an operator 21; 904, a radiography ready signal of the X-ray detector 107; 905, a driving signal of an anti-scatter grid; 906, a power control signal in the X-ray detector 107; and 907, a driving state of the X-ray detector (especially, the charge read operation from the photodetector array). Reference numeral 908 denotes an image data transfer state or an image processing/display state.

The afterimage determination driving in FIG. 13 will be described. When an X-ray generator exposure request SW 900 is pressed, the imaging apparatus driving state 907 is driven. Of idling driving, at least one image is driven by the same driving as in the actual read. The presence/absence of an afterimage is determined by a method to be described later by using the obtained FPN image. The driving is the same as in FIG. 12.

The operation of the X-ray detector 107 will be described next mainly with reference to FIG. 13.

The time until a detector preparation request or radiography request is issued in FIG. 13 will be described. Until the operator 21 inputs a detector preparation request or radiography request, the driver 62 stands by while setting the power control signal in the OFF state, as indicated by 906. More specifically, referring to FIG. 11, the row selection wiring lines Lr, column signal wiring lines Lc, and bias wiring lines Lb are kept at an equipotential (particularly, signal GND level), and no bias is applied to the photodetector array 58. Alternatively, the row selection wiring lines Lr, column signal wiring lines Lc, and bias wiring lines Lb may be kept at the GND potential by cutting off a power supply including the signal read circuit 100, a line selector 92, and a bias power supply 84 or 85.

The detector preparation request or radiography request in FIG. 13 will be described. The operator inputs a radiography preparation request instruction (901, 1st SW) to the operator interface 116. Accordingly, the radiography controller 109 outputs an instruction to change an X-ray generator 40 to a radiography ready state and the X-ray detector 107 to the radiography reparation state. Upon receiving the instruction, the driver 62 applies a bias to the photodetector array 107 and repeats a pre-read Fi. The request instruction is an instruction which is issued by the 1st switch of the exposure request SW to the X-ray generator (normally, rotor up of the tube or the like is started) or an instruction to start preparation of the X-ray detector 107 when it requires a predetermined time (several sec or more) for preparation for radiography. In this case, the operator need not always consciously input the radiography preparation request instruction to the X-ray detector 107. More specifically, when object information or radiography information is input to the operator interface 116, the radiography controller 109 may interpret it as a detector preparation request instruction and change the X-ray detector 107 to the detector preparation state.

Figure 14:
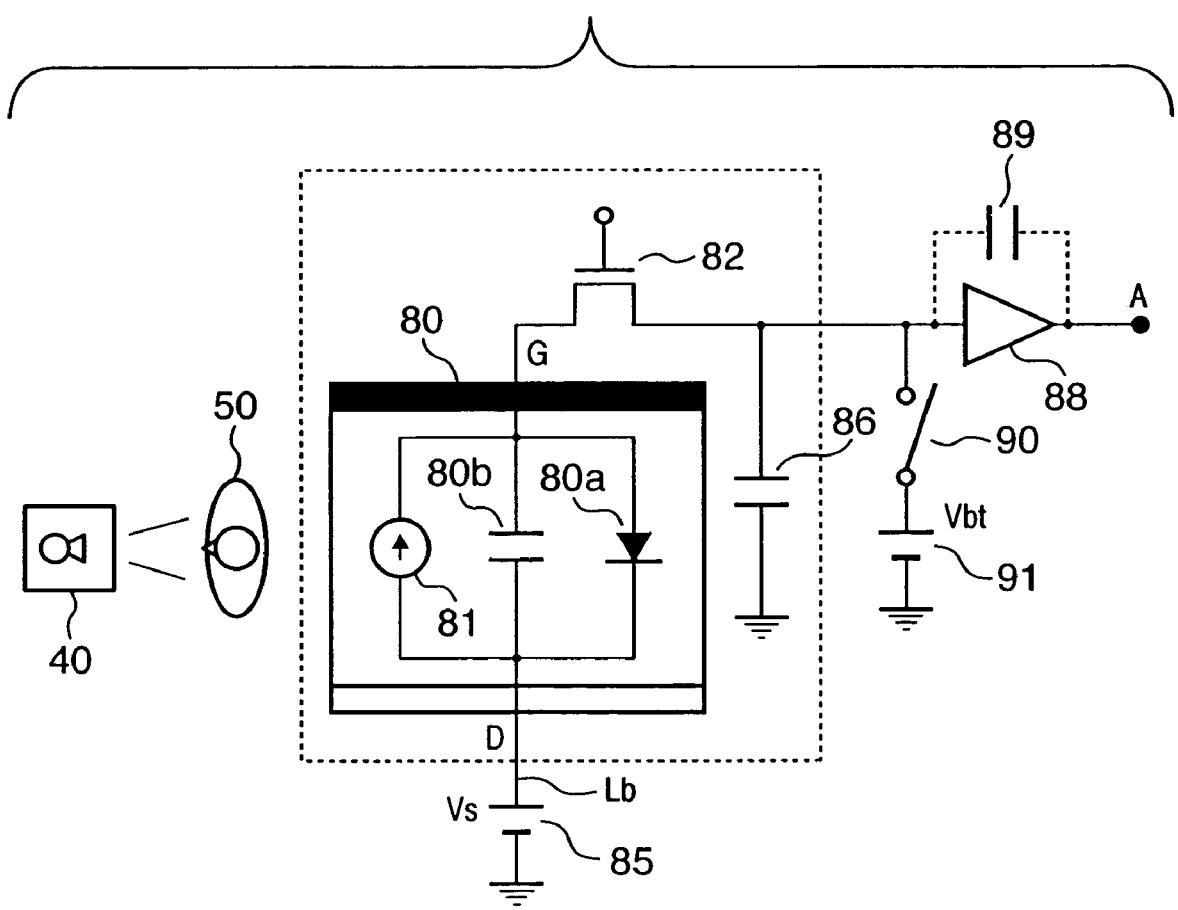
FIG. 14 is an equivalent circuit diagram of a photodetection unit.

The detector preparation state shown in FIG. 13 will be described with reference to FIG. 14. In the detector preparation state, in the photoelectric conversion mode, after the pre-read, to prevent a dark current from being gradually accumulated in the photodetection unit 80 and a capacitor 80b from being held in the saturated state, the pre-read Fi is repeated at a predetermined interval. The driving executed during the period in which the radiography preparation request from the operator 21 is received, and no actual X-ray exposure request is generated, i.e., the driving in which the pre-read Fi is repeated at a predetermined time interval T1 in the detector preparation state will be referred to as "idling driving" hereinafter. The period of the detector preparation state in which the idling driving is executed will be referred to as an "idling driving period" hereinafter. The duration of idling driving is undefined for actual use. For this reason, T1 is set to be longer than in the normal radiography operation to minimize the read operation which places load on the photodetector array 58 (especially, the TFTs 82). Accordingly, the pre-read driving Fi dedicated to idling is executed, in which the ON time of the TFT 82 is shorter than in normal read driving Fr.

<FPN Image Uniformity Determination Processing>

In the above-described series of radiography operations, to execute afterimage erase processing only when it is necessary, processing for determining the presence/absence of an afterimage in the first and second FPN images must be executed.

Figure 2:
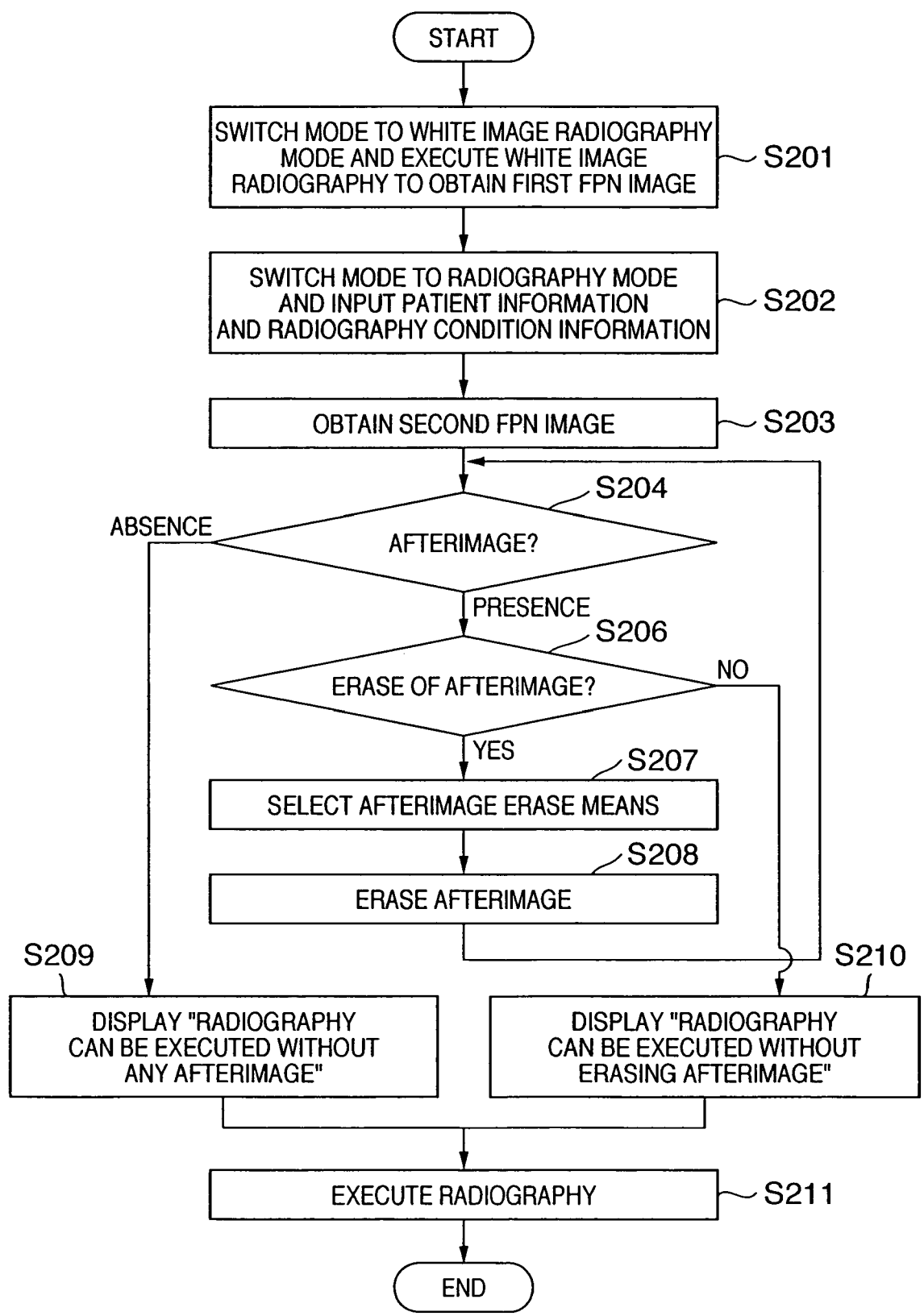
FIG. 2 is a flowchart showing processing for determining the presence/absence of an afterimage in first and second FPN images in the embodiment of the present invention.

FIG. 2 is a flowchart showing processing for determining the presence/absence of an afterimage in first and second FPN images in the first embodiment of the present invention. The program corresponding to the flowchart in FIG. 2 is stored in the memory 111. The CPU 109 can execute processing corresponding to the flowchart in FIG. 2 by executing the program.

Determining the presence/absence of an afterimage in the first and second FPN images is also relevant to determining the effectiveness of an afterimage in the white image for white correction.

The uniformity determination processing to be described below is executed only when the operation unit 116 or another instruction device is operated to set the operation mode of the radiographic apparatus 100 to the FPN image uniformity determination mode.

As described above, white image radiography must be executed first. The operator operates the operation unit 116 to set the operation mode of the radiographic apparatus 100 to a white image radiography mode. When the mode setting instruction is received in step S201, a white image is radiographed. A white image is radiographed by, e.g., causing the radiation generator 103 to generate "radiation within a dose range with linearity", the radiation tube 101 to radiate the radiation, and the radiographic unit 106 to radiograph the radiated radiation.

At this time, an FPN image (first FPN image) to FPN-correct the white image is also acquired simultaneously. The data of the first FPN image is stored in the memory 113 together with the white image data.

Next, the operator inputs patient information and radiography condition information and executes radiography for the object on the basis of these pieces of information. For this purpose, the operator operates the operation unit 116 to set the operation mode of the radiographic apparatus 100 to the radiography mode. The operator also inputs the patient information and radiography condition information by using the operation unit 116. When the mode setting instruction is received in step S202, the patient information and radiography condition information input next are stored in one of the memories 111 to 113.

In step S203, the second FPN image is obtained by the above-described processing. The trigger to obtain the second FPN image is preferably the end of input of the information in step S202. However, it may be the end of input of radiography condition information as information to be set to cause the radiation generator 103 to generate radiation and, more particularly, pressing of the radiography button 102.

In step S204, the uniformity of the first FPN image and the uniformity of the second FPN image are determined. That is, processing for determining the presence/absence of an afterimage in the first FPN image and processing for determining the presence/absence of an afterimage in the second FPN image are executed. The processing in step S204 will be described later in detail with reference to FIG. 3.

The processing branches in accordance with the presence/absence of an afterimage. If an afterimage is present, the processing advances to step S206. If no afterimage is present, the processing advances to step S209. If an afterimage is present, i.e., in step S206, a message representing it is displayed on the display screen of the operation device 116.

Figure 7:
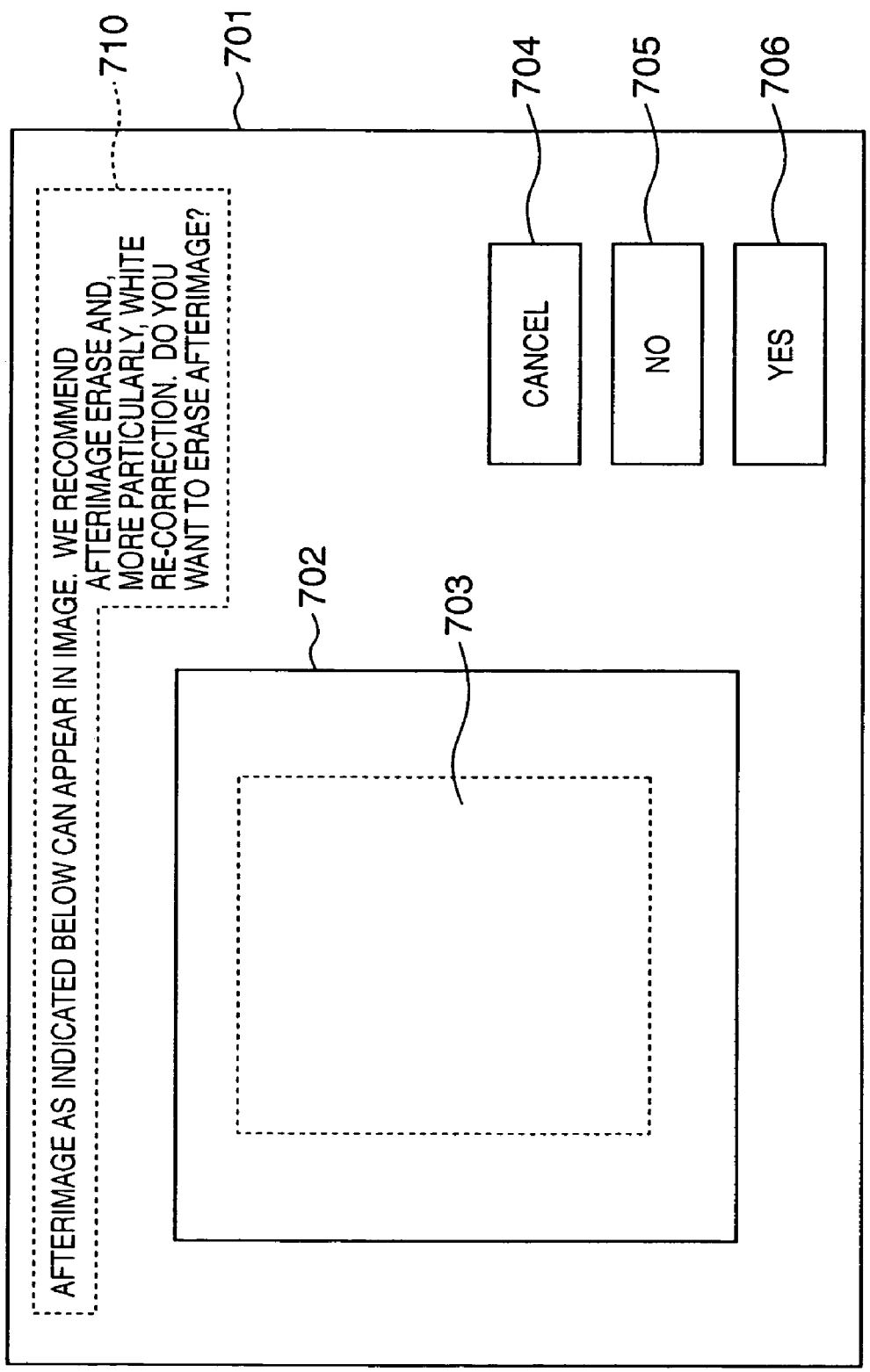
FIG. 7 is a view showing an example of a window to display a message which is displayed on the display screen of an operation device 116 to indicate the presence of an afterimage or nonuniformity in the first or second FPN image.

FIG. 7 is a view showing an example of a window to display a message which is displayed on the display screen of the operation device 116 to indicate an alert for the presence of an afterimage or nonuniformity in the first or second FPN image.

Reference numeral 701 denotes a display window. The display window 701 is displayed on the display screen of the operation device 116, as described above. Buttons and the like are normally displayed on the display screen of the operation device 116. The window shown in FIG. 7 may be displayed by switching the display. Alternatively, a region to display the window shown in FIG. 7 may newly be arranged while maintaining the normal display.

A message 710 to notify the user of a recommendable correction method is displayed in the display window 701 together with the above message. To execute the correction, the operator instructs a "YES" button region 706. If the correction should not be executed, the operator instructs a "NO" button region 705 or "CANCEL" button region 704. Accordingly, the CPU 109 executes processing corresponding to the instructed region. This correction processing will be described later.

The display window 701 also includes a region 702 in which the first FPN image or second FPN image is displayed. An afterimage region 703 is displayed in the region 702. Hence, the operator can visually confirm the afterimage and its position and determine whether the afterimage should the erased.

If an afterimage is present, it must be selected whether the afterimage is to be erased. As described above, since processing for erasing an afterimage is time-consuming, the instantaneousness as a characteristic feature of the digital radiographic apparatus cannot be used. In addition, if radiography should be executed soon, the afterimage amount is small, the afterimage is present outside the region of interest in the radiographic image, or radiography can be executed while avoiding the afterimage position, the afterimage need not be erased.

In step S206, whether afterimage erase processing should be executed is instructed by using the window shown in FIG. 7. That is, an instruction of one of the button regions 704 to 706 is received.

When an instruction to erase the afterimage is input (the button region 706 is instructed in the window shown in FIG. 7), the processing advances to step S207. When an instruction not to erase the afterimage is input (the button region 704 or 705 is instructed in the window shown in FIG. 7), the processing advances to step S210.

In step S207, an erase method to be used for afterimage erase is selected. A list of erase methods may be displayed on the display screen of the operation device 116. However, the list presentation method for selection is not limited. The presented list can contain a method using optical reset, a method using uniform high dose irradiation radiography, and a method using white image re-radiography.

In this embodiment, a method which does not use optical reset is defined as the best mode, and a method which erases an afterimage by a method (to be described later) classified on the basis of the image used to determine the presence/absence of an afterimage is defined as the best mode. However, the present invention is not limited to this. Classification of the afterimage erase methods will be described later with reference to FIG. 4.

In step S207, the selection result input by the operator using the operation device 116 is received.

In step S208, the afterimage is erased in accordance with the selection result input in step S207, i.e., the afterimage erase method. The processing returns to step S204 to confirm the presence/absence of an afterimage.

When an instruction not to erase the afterimage is input (when the button region 704 or 705 is instructed in the window shown in FIG. 7), the processing advances to step S210, as described above. A message representing that "radiography can be executed without erasing the afterimage" is displayed on the display screen of the operation device 116.

As described above, in step S204, the processing branches in accordance with the presence/absence of an afterimage. If no afterimage is present, the processing advances to step S209.

In step S209, a message representing that "radiography can be executed without any afterimage" is displayed on the display screen of the operation device 116. In step S211, radiography processing of the radiographic image of the object is started in accordance with the contents described in <Series of Operations of Radiographic Apparatus 100>.

The processing in step S204, i.e., processing for determining the presence/absence of an afterimage in the first FPN image and the presence/absence of an afterimage in the second FPN image (determining the presence/absence of an afterimage in the first and second FPN images) will be described in more detail with reference to FIG. 3 which shows the flowchart of the processing. FIG. 3 is a flowchart of the afterimage determination processing according to the first embodiment.

In step S301, both the first FPN image and the second FPN image stored in the memory 113 are segmented into a plurality of rectangles. For example, if the amplifier IC changes for every 128 pixels, each rectangle may have a size corresponding to an amplifier IC. If the output value such as the sensitivity of the photoelectric conversion element or phosphor varies, the size may correspond to 128 pixels×64 pixels such that the characteristic does not largely change in the same region.

If the rectangle size is too small, the calculation time in step S204 becomes long. In addition, the calculation result of the statistic (in this embodiment, the average value and standard deviation) in the next step (step S302) readily contains errors. If the size is too large, a nonuniformity may be generated by a factor other than an afterimage, and for example, the difference of power supply. Hence, the size must be adjusted carefully.

In step S302, the average value and standard deviation of the values of pixels in each rectangle are obtained. This processing is executed for each rectangle of the first FPN image and second FPN image. Accordingly, the average value and standard deviation can be obtained for each rectangle of the first FPN image and second FPN image.

In step S303, the presence/absence of an afterimage in the first FPN image is determined by using the average value obtained for each rectangle of the first FPN image. In addition, the presence/absence of an afterimage in the second FPN image is determined by using the average value and standard deviation obtained for each rectangle of the second FPN image. Accordingly, it is determined whether the first and second FPN images have an afterimage. If the first or second FPN image contains an afterimage, the regions of the afterimages are compared.

More specifically, let WAi be the average value of the values of pixels in the ith rectangle of the first FPN image, WSi be the standard deviation of the pixel values, GAi be the average value of the values of pixels in the ith rectangle of the second FPN image, and GSi be the standard deviation of the pixel values. A1i, A2i, E1i, and E2i are obtained by $$A1i = GAi/WAi$$

$$A2i = GAi - WAi$$

$$E1i = GSi/WSi$$

$$E2i = GSi - WSi$$

Comparison is done in accordance with predetermined comparison expressions by using the obtained values. For this rectangle, it is determined that "an afterimage is present" or "no afterimage is present".

After the presence/absence of an afterimage is grasped, the threshold values for uniformity are set to values corresponding to the human visible limit for each value, thereby grasping the presence/absence of an afterimage. For example, when "A2i>0.5", "1.0001>A1i>0.9999", "1.1>E1i>0.9", and "E2i>0.05", it is determined that "an afterimage is present" in the ith rectangle of the first FPN image and the ith rectangle of the second FPN image. In this way, the presence/absence of an afterimage can be determined for each rectangle of the first and second FPN images.

The determination result is recorded in one of the memories 111 to 113 as data.

As for the threshold values of the comparison expressions such as "A2i>0.5 LSB or more" and "1.0001>A1i>0.9999", whether an afterimage in a radiographed image is actually visible to the human eye depends on the S/N ratio of the radiographic image obtained by the radiographic apparatus 100 or the radiography condition information. Hence, the threshold values are not absolute and change depending on the conditions. The visible limit by an image quality has been modeled in, e.g., F. L. VAN NES and M. A. BOUMAN, "The effects of wavelength and luminance on visual modulation transfer".

If the first FPN image has at least one rectangle for which it is determined by the above-described method that "an afterimage is present", it is determined that "an afterimage is present in the first FPN image".

Similarly, if the second FPN image has at least one rectangle for which it is determined by the above-described method that "an afterimage is present", it is determined that "an afterimage is present in the second FPN image". Preferably, it is determined whether the rectangular regions for which it is determined that "an afterimage is present" are adjacent, and the alert level is increased as the number of regions adjacent to each other increases. It is also preferable that the indices of the regions for which it is determined that "an afterimage is present" or, for example, "A2i>0.5 LSB or more" and "1.0001>A1i>0.9999" be set to a plurality of levels and classified into, e.g., "alert" and "error". For example, when "A2i>0.5 LSB or more" and "1.0001>A1i>0.9999", the level is preferably determined as "error". If one of the conditions is satisfied, or "A2i>0.2 LSB or more" and "1.00005>A1i>0.99995", the level is preferably determined as "alert". In the above example, the average value and standard deviation are calculated after the FPN images are segmented into rectangles. However, an image may be generated first by subtracting the second FPN image from the first FPN image. After that, the average value and standard deviation of the image are calculated.

If it is determined that both of the first and second FPN images have no afterimage, the processing advances to step S209. If it is determined that the first FPN image and/or second FPN image has an afterimage, the processing advances to step S206.

With the above-described processing shown in FIG. 3, the presence/absence of an afterimage in each FPN image can be determined.

Classification of the afterimage erase methods will be described next. FIG. 4 is a view showing classification of the afterimage erase methods. Afterimage erase is executed when the first FPN image or second FPN image has nonuniformity such as an afterimage.

Referring to FIG. 4, if it is determined in step S204 that an afterimage is present (nonuniformity is present) in only the first FPN image, the afterimage is erased by using the above-described white image re-radiography method. Alternatively, the message 710 which recommends use of the white image re-radiography method is displayed in the window shown in FIG. 7.

On the other hand, if it is determined in step S204 that an afterimage is present (nonuniformity is present) in only the second FPN image, the afterimage is erased by using the above-described uniform high dose irradiation radiography method or a method of prolonging the Sleep time. Alternatively, the message 710 which recommends use of the white image re-radiography method or the method of prolonging the Sleep time is displayed in the window shown in FIG. 7.

If it is determined that afterimages are present (nonuniformity is present) in both of the first and second FPN images, the positions and amounts of the afterimages are compared. First, the positions of the afterimages are compared to determine whether they are located at the same position. If the afterimages are present at the same position, it is determined whether the afterimages have the same nonuniformity amount. As the threshold value of the nonuniformity amount, the threshold value of the above-described expression may directly be used. However, as described above, the threshold value of the visible limit changes depending on the radiography condition or lightness in observation. If the above-described positions and amounts of the afterimages are different, they are erased by using both the above-described white image re-radiography method and the above-described uniform high dose irradiation radiography method (and the method of prolonging the Sleep time).

Figure 8:
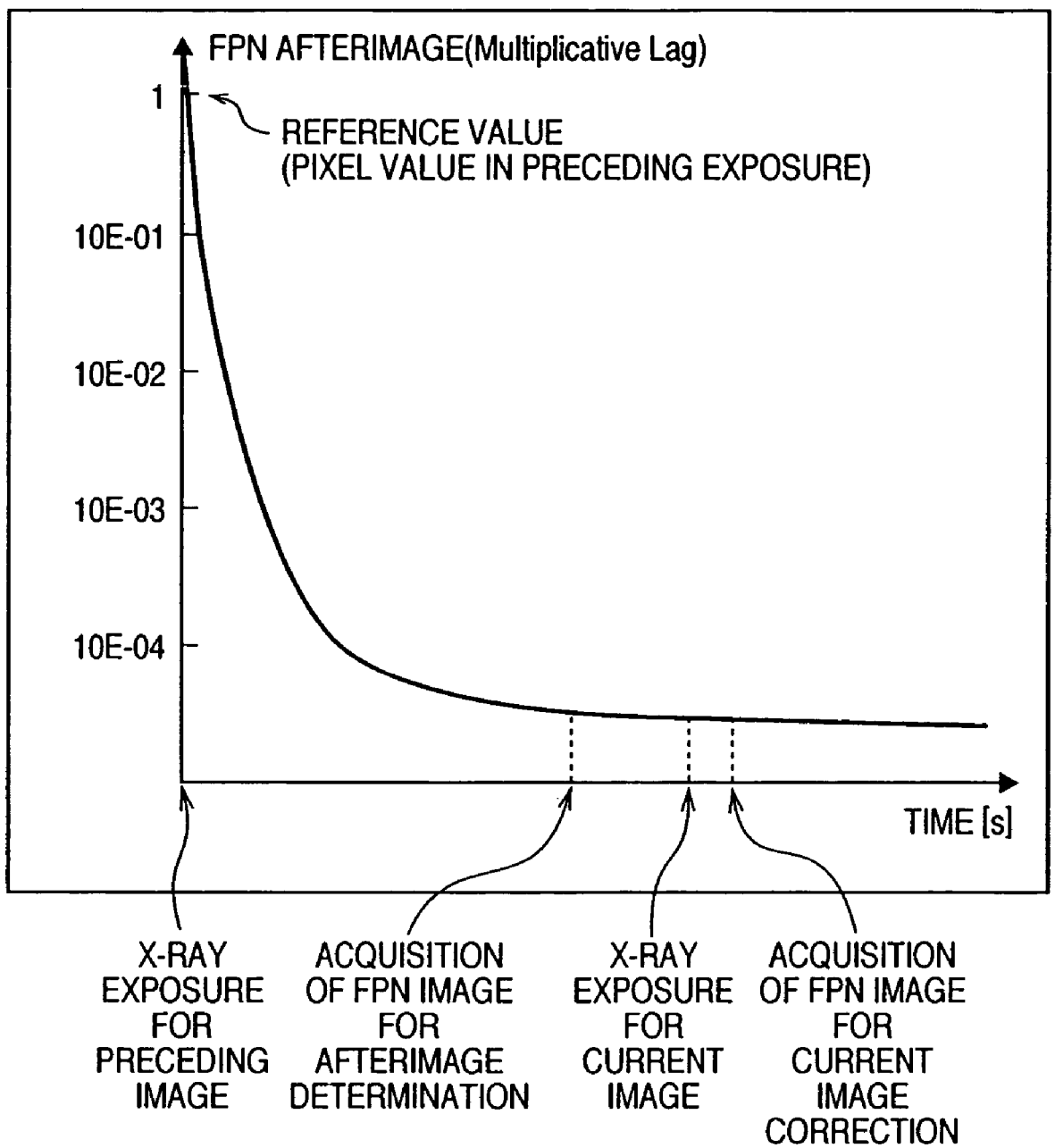
FIG. 8 is a view for complementarily explaining the processing for determining the presence/absence of an afterimage.
Figure 10:
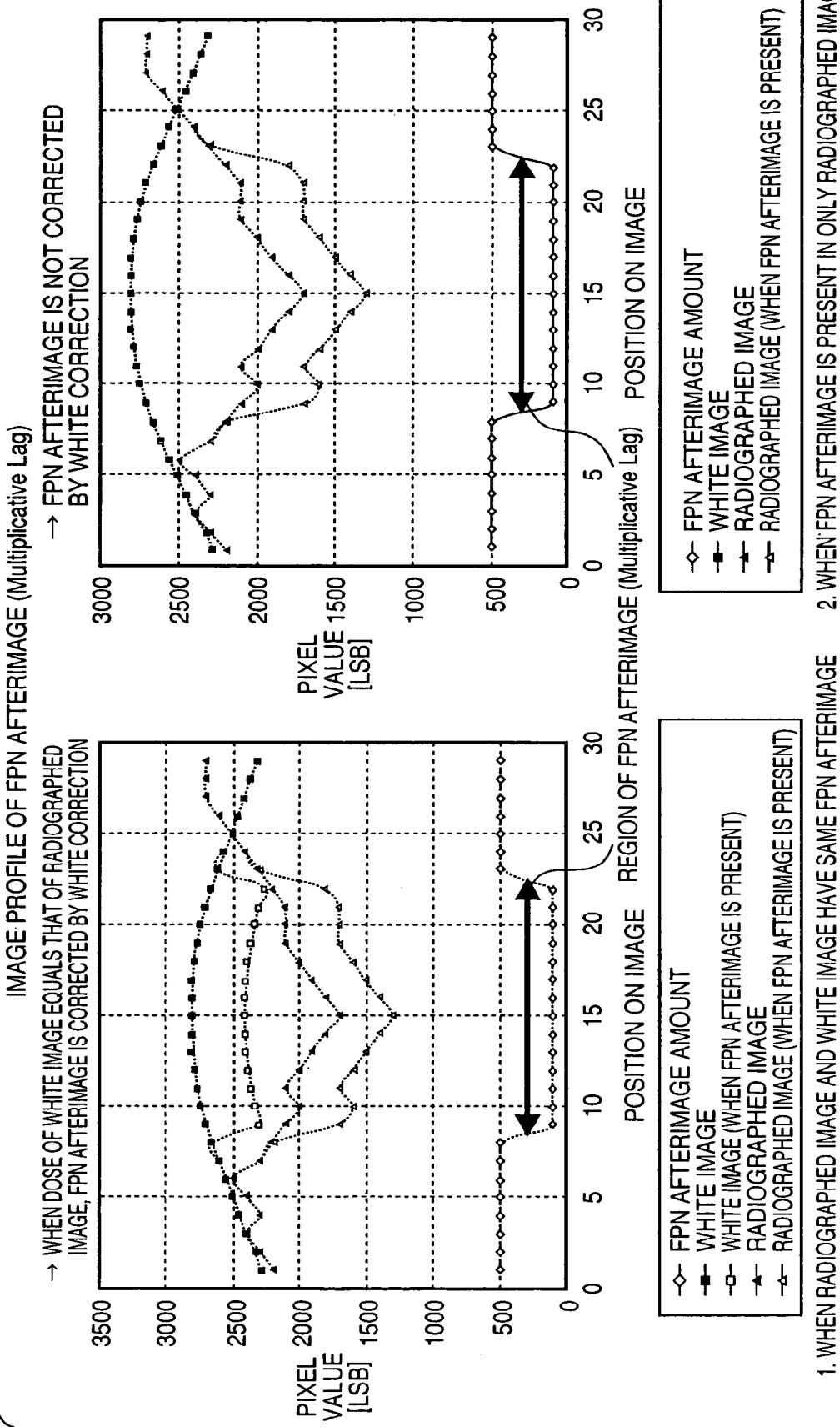
FIG. 10 is a view showing the influence of an FPN afterimage (additive lag) on an image.

FIG. 10 is a view showing the influence of an FPN afterimage (additive lag) on an image. FIG. 10 shows line graphs each of which is plotted along one section in an image. An FPN afterimage (additive lag) here indicates an afterimage generated when the output value from the X-ray detector 107 increases after X-ray irradiation in only the irradiated region. An example of the cause is the above-described phosphor afterglow shown in FIG. 8. FIG. 10 shows a simulation in which the FPN afterimage amount is exaggerated to about 500 LSB to make the image profile easy to understand. (1) shows the image profile of a radiographed image and a white image when they have FPN afterimages having the same amount in the same region. (2) shows an image profile when an FPN afterimage is present in only the radiographed image. Consider that white correction is executed for both of (1) and (2).

In the white correction method, as described in detail in Japanese Patent Laid-Open No. 2001-351091, let W be the pixel value of the white image, and X be the pixel value of the radiographed image. At this time, the pixel value after white correction is represented by X/W*means(X). As is apparent from comparison between this and FIG. 10, when FPN afterimages having the same amount are present in the same region, as indicated by (1), and the dose of the radiographed image is the same as that of the white image, no afterimage appears after white correction. If the remaining conditions in (1) change, or in (2), an afterimage appears after white correction. That is, except the strictly limited case in (1), the FPN afterimage is not corrected by white correction.

Figure 15:
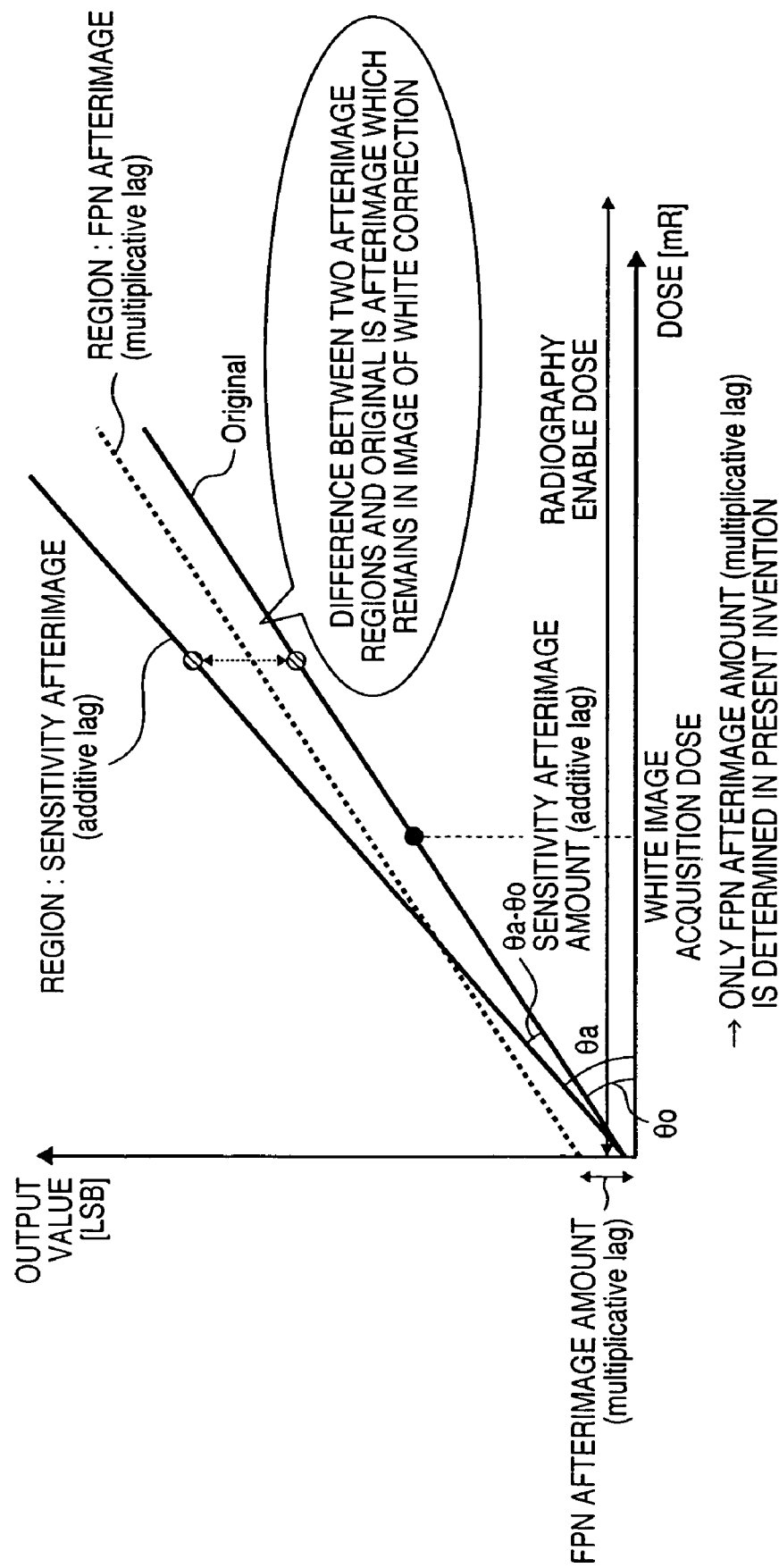
FIG. 15 is a graph showing the dose dependence of a sensitivity afterimage (multiplicative lag) and FPN afterimage (additive lag).

FIG. 15 is a graph showing the dose dependence of a sensitivity afterimage (multiplicative lag) and FPN afterimage (additive lag). Dose vs. output when no afterimage is present is indicated by "original". The "FPN afterimage (additive lag)" is added as an offset in the same amount to the output value (pixel value) independently of the dose. For the "sensitivity afterimage (multiplicative lag)", the gradient of dose vs. output changes from that of original. The sensitivity increases by θa−θo. In this embodiment, it is the FPN afterimage (additive lag) that should be determined. As is apparent from FIG. 15 and the above-described white correction expression, when the dose of the white image is the same as that of the radiographed image, the afterimage disappears after white correction. This occurs only when the FPN afterimages having the same amount are present in the same region.

FIGS. 5 and 6 are views for complementarily explaining the processing for determining the presence/absence of an afterimage. In the radiographic apparatus 100 according to this embodiment, since white correction is executed, it is also necessary to do comparison to determine whether an afterimage is present in the white image. To determine the presence/absence of an afterimage in the image after white correction, only the first FPN image needs to be observed.

FIG. 5 shows a case wherein an afterimage is present in the second FPN image. Assume that the amounts and positions of afterimages are the same. In this case, the effect of the presence/absence of an afterimage in the first FPN image may be reverse to the effect in the radiographic image, as indicated by (1) and (2).

As shown in FIG. 6, even when no afterimage is present, if the second FPN image has an afterimage in (1) and (2), the afterimage appears in the image after white correction.

Due to the reason explained with reference to FIGS. 5 and 6, the presence/absence of an afterimage must be determined not only in the second FPN image but also by comparing the second FPN image with the first FPN image. The above-described afterimage is a phenomenon viewed from an image and may be any other nonuniformity by, e.g., external magnetic noise.

The FPN image to be used for comparison/determination need not always be an FPN image acquired in acquiring the white image. It may be an FPN image acquired in, e.g., acceptance inspection or shipment from the factory. The FPN image is not limited to a single FPN image. An average value of a plurality of FPN images may be used, or a plurality of FPN images may be used.

Second Embodiment

The second embodiment will be described in which the presence/absence of an afterimage is determined by using edge detection of an FPN image. In this embodiment, edge detection is executed by using an FPN image before radiography and an FPN image in acquiring a white image as a means for determining the presence/absence of an afterimage, thereby detecting an afterimage.

Figure 9:
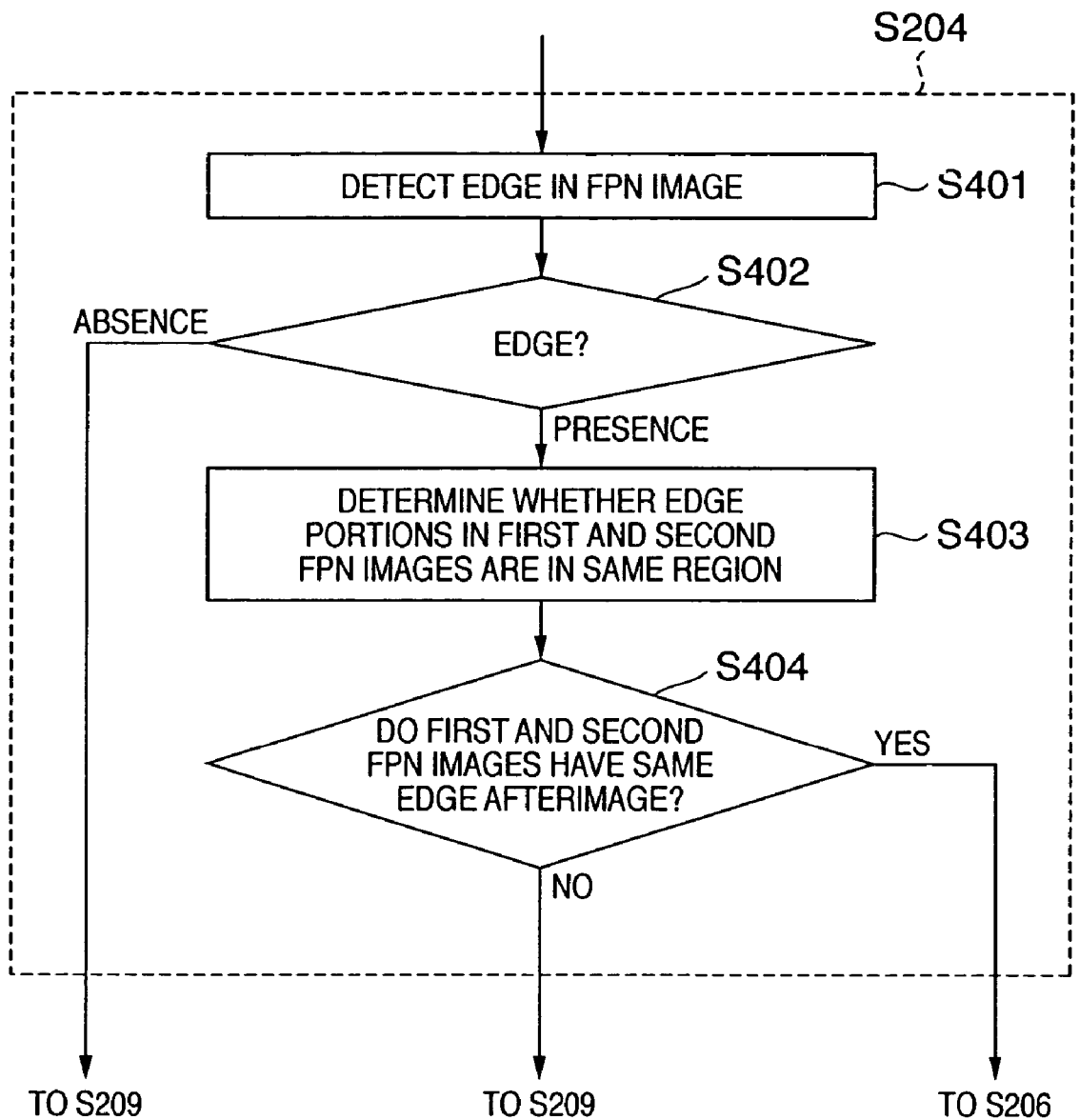
FIG. 9 is a flowchart showing processing for determining the presence/absence of an edge afterimage.

FIG. 9 is a flowchart of processing for determining the presence/absence of an afterimage in the first and second FPN images in this embodiment. The program corresponding to the flowchart in FIG. 9 is stored in a memory 111. A CPU 109 can execute processing corresponding to the flowchart in FIG. 9 by executing the program. FIG. 9 shows a flowchart executed by using edge detection in an afterimage determination step S204.

The steps shown in FIG. 9 will be described. First, in step S401, the edge of an FPN image is detected. To detect the edge, for example, Japanese Patent Laid-Open No. 2001-307064 is used. In this method, an edge is determined on the basis of the pattern of pixel values around the edge portion. Although this is an edge extraction method for irradiation field recognition in an X-ray image, it can also be applied to an FPN image. However, since an FPN image can contain FPN noise (Fixed Pattern Noise), edge detection is preferably executed after noise is corrected by averaging the FPN image in the vertical and horizontal directions. Alternatively, to correct FPN noise, edge detection may be executed by using the difference image between the first FPN image and the second FPN image (in this case, it can be determined in step S403 (to be described later) on the basis of one image whether the edges in the first and second FPN images are at the same portion). Next, in step S402, the presence/absence of an edge in the first and second FPN images is determined. In step S403, it is determined whether the edge portions of the first and second FPN images are in the same region. Whether the edges are in the same region is determined on the basis of the tilts and positions of the edges. If a blur is generated by the scattered rays of the original image of the afterimage as the cause of the edge or the calculation error range of edge extraction is different, whether the edges are in the same region may be determined by observing the images and subtraction of the images. Whether the same edge is present in the first and second FPN images is determined in step S404. If the same edge is present, "radiography can be executed without any afterimage" is displayed in step S208, and radiography is executed. If the same edge is not present, it is determined in step S205 whether the afterimage is to be erased.

In the afterimage amount, the dose difference from the preceding image remains. For this reason, the maximum value is obtained between the transparent region and the irradiation stop at a high probability. That is, the afterimage is related to the irradiation field of the preceding image. Hence, the presence/absence of an edge at that portion may be determined by using the irradiation field of the preceding image.

The determination method using edge detection of this embodiment can also be used to complement the first embodiment. For example, when an afterimage is smooth to an image, it may give only shading on the radiographed image and no influence on diagnosis. An afterimage influences diagnosis only when an edge is present on the image. That is, in the first embodiment, the former case is determined as "an afterimage is present". Hence, the second embodiment may be used to complement the first embodiment.

The object of the present invention is achieved even by supplying a recording medium (or storage medium) which stores software program codes for implementing the functions of the above-described embodiments to a system or apparatus and causing the computer (or a CPU or MPU) of the system or apparatus to read out and execute the program codes stored in the recording medium. In this case, the program codes read out from the recording medium implement the functions of the above-described embodiments by themselves, and the recording medium which stores the program codes constitutes the present invention.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the recording medium, it stores program codes corresponding to the above-described flowcharts.

As many apparently widely different embodiments of the present invention can be made without departing from the spirit and scope thereof, it is to be understood that the invention is not limited to the specific embodiments thereof except as defined in the claims.

What is claimed is:

1. A radiographic apparatus for executing radiography, comprising:
    a setting unit that sets one of a reference image radiography mode and a radiographic image radiography mode;
    a first acquisition unit that acquires a first FPN image as a reference by causing a sensor having an amplifier IC to detect a radiation ray within a dose range with linearity, when the reference image radiography mode is set;
    a second acquisition unit that acquires a second FPN image by causing the sensor to detect a radiation ray which is irradiated on the basis of a radiography condition being set for the purpose of radiographing an object, when the radiographic image radiography mode is set;
    a first division unit that divides the first FPN image into respective first rectangles, each of which has a size corresponding to the amplifier IC;
    a second division unit that divides the second FPN image into respective second rectangles, each of which has the size;
    a first calculation unit that calculates statistical amount of pixels included in the first rectangle, for each of the first rectangles;
    a second calculation unit that calculates second statistical amount of pixels included in the second rectangle, for each of the second rectangles;
    a third calculation unit that calculates variation amounts between the first statistical amounts and the second statistical amounts; and
    a determination unit that determines that an afterimage is present on the first and second FPN images, when at least one of the variation amounts is larger than a predetermined amount.

2. A radiographic method for executing radiography, comprising:
    setting one of a reference image radiography mode and a radiographic image radiography mode;
    first acquiring of a first FPN image as a reference by causing a sensor having an amplifier IC to detect a radiation ray within a dose range with linearity, when the reference image radiography mode is set;
    second acquiring of a second FPN image by causing the sensor to detect a radiation ray which is irradiated on the basis of a radiography condition being set for the purpose of radiographing an object, when the radiographic image radiography mode is set;
    first dividing of the first FPN image into respective first rectangles, each of which has a size corresponding to the amplifier IC;
    second dividing of the second FPN image into respective second rectangles, each of which has the size;
    first calculating of a statistical amount of pixels included in the first rectangle, for each of the first rectangles;
    second calculating of a second statistical amount of pixels included in the second rectangle, for each of the second rectangles;
    third calculating of variation amounts between the first statistical amounts and the second statistical amounts; and
    determining that an afterimage is present on the first and second FPN images, when at least one of the variation amounts is larger than a predetermined amount.

* * * * *